(12) United States Patent
Chen

(10) Patent No.: US 6,267,451 B1
(45) Date of Patent: Jul. 31, 2001

(54) WHEEL DISC DEVICE

(76) Inventor: Tsai Chia Chen, 20F, No. 1-1, Chung Cheng Road, Chung Ho, Taipei Hsien (TW)

( * ) Notice: Subject to any disclaimer, the term of this patent is extended or adjusted under 35 U.S.C. 154(b) by 0 days.

(21) Appl. No.: 09/401,515

(22) Filed: Sep. 22, 1999

(51) Int. Cl.⁷ ....................................................... B60B 7/06
(52) U.S. Cl. .................................................... 301/37.41
(58) Field of Search ............................... 301/37.1, 37.21, 301/37.29, 37.37, 37.34, 37.41, 37.42, 37.43; 280/288.4, 293, 296; 411/554, 555

(56) References Cited

U.S. PATENT DOCUMENTS

| | | | | |
|---|---|---|---|---|
| 2,527,408 | * | 10/1950 | Dzus | 411/555 |
| 2,585,233 | * | 2/1952 | Dzus | 411/555 |
| 3,034,833 | * | 5/1962 | Ares | 301/37.41 |
| 3,317,246 | * | 5/1967 | Wester | 301/37.41 |
| 3,602,550 | * | 8/1971 | Patane | 301/37.41 |
| 4,171,851 | * | 10/1979 | Scruggs | 301/37.21 |
| 4,209,230 | * | 6/1980 | Perkins | 359/523 |
| 4,296,939 | * | 10/1981 | Iwamoto | 301/37.41 |
| 4,418,962 | * | 12/1983 | Schaffer | 301/37.42 |
| 4,488,774 | * | 12/1984 | Kagayama | 301/37.41 |
| 4,591,210 | * | 5/1986 | Nickoladze | 301/37.29 |
| 4,657,309 | * | 4/1987 | Kang | 301/37.29 |
| 6,089,671 | * | 7/2000 | Lacovelli et al. | 301/37.1 |

\* cited by examiner

Primary Examiner—S. Joseph Morano
Assistant Examiner—Long Bae Nguyen
(74) Attorney, Agent, or Firm—Rosenberg, Klein & Lee

(57) ABSTRACT

A wheel disc device includes a wheel disc and locking devices. The wheel disc includes an outer cover and a seat. The wheel disc is locked to the wheel frame of a bicycle by locking devices. Illumination devices, audio devices or video devices can be attached to the wheel disc. Therefore, as power is actuated and the bicycle is driven, light cycles with different patterns or audio effects will be emitted. By the present invention, different decorations can be firmly secured to the wheel of a bicycle.

5 Claims, 5 Drawing Sheets

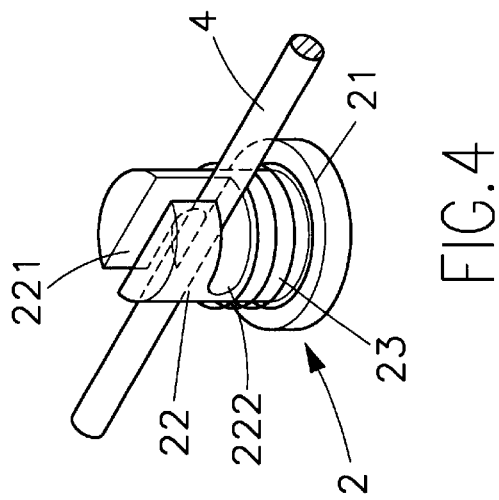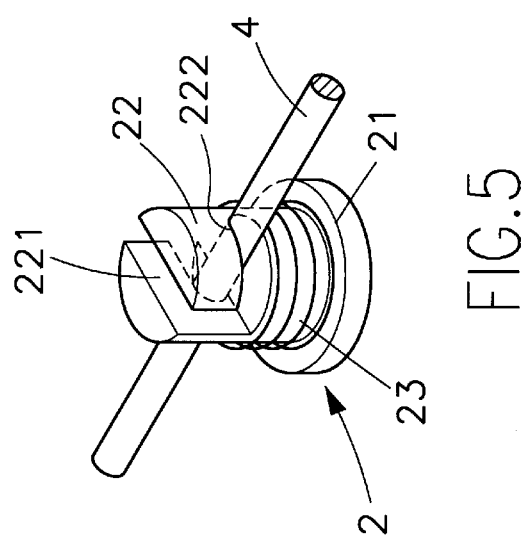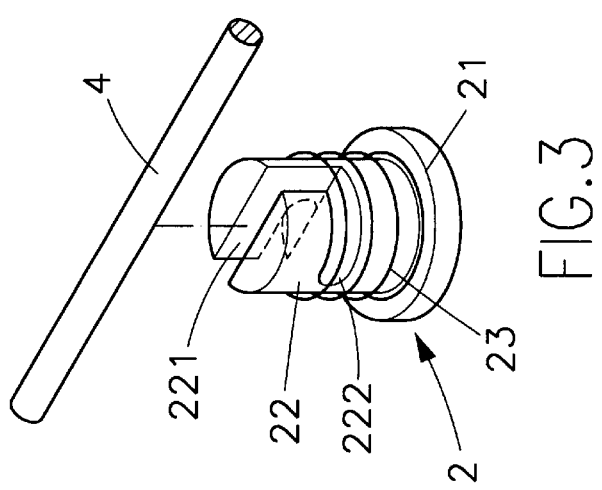

WHEEL DISC DEVICE

FIELD OF THE INVENTION

The present invention relates to a disc device includes a wheel disc and locking devices. Thereby, illumination devices, audio devices or video devices can be attached to the wheel disc of a bicycle.

BACKGROUND OF THE INVENTION

In the prior art, devices, such as illumination devices, audio devices or video devices are directly attached to the wheel disc of a bicycle or are integrally formed on a bicycle. However, if the wheel is destroyed, these decorations must be deserted together. Often if the aforesaid devices can be detached, often these devices can not be used again.

Therefore, it is discovered that in the prior art, the audio, video, other devices are formed integrally or are attached to the wheel by user himself (or herself). The detachment and attachment works are very complicated. Thus, it is very difficult to be reused or updated. Moreover, it is very difficut to match with other devices. Therefore, the cost is high.

In summary, the prior art has following disadvantages:

1. The attachment and detachment of prior art devices must be performed by other tools. The work hour is long and the utility is low.
2. The prior art is formed integrally, thus, it is difficult to be reused. Often, if the wheel is destroyed, the audio or video devices can not be used.
3. The prior art is difficult to be used with other devices.

Therefore, there is an eager demand for a novel wheel disc device, by which the audio or video devices can be attached thereto, and then this disc is attached to the wheel. Therefore, by detaching this wheel disc, the audio or video device can be reused or updated conveniently and easily.

SUMMARY OF THE INVENTION

Accordingly, the primary object of the present invention is to provide a wheel disc device includes a wheel disc and locking devices. The wheel disc includes an outer cover and a seat. The wheel disc is locked to the wheel frame of a bicycle by locking devices. Illumination devices, audio devices or video devices can be attached to the wheel disc. Therefore, as power is actuated and the bicycle is driven, light cycles with different patterns or audio effects will be emitted. By the present invention, different decorations can be firmly secured to the wheel of a bicycle.

Another object of the present invention is to provide a wheel disc device used with wheel frames in various orientations.

The various objects and advantages of the present invention will be more readily understood from the following detailed description when read in conjunction with the appended drawing.

BRIEF DESCRIPTION OF THE DRAWINGS

FIG. 3 is a schematic view showing an action of the locking device of the wheel disc device.

FIG. 4 is a schematic view showing another action of the locking device wheel disc device.

FIG. 5 is a schematic view showing another action of the locking device of the wheel disc device.

DETAILED DESCRIPTION OF THE PREFERRED EMBODIMENTS

Figure 1:
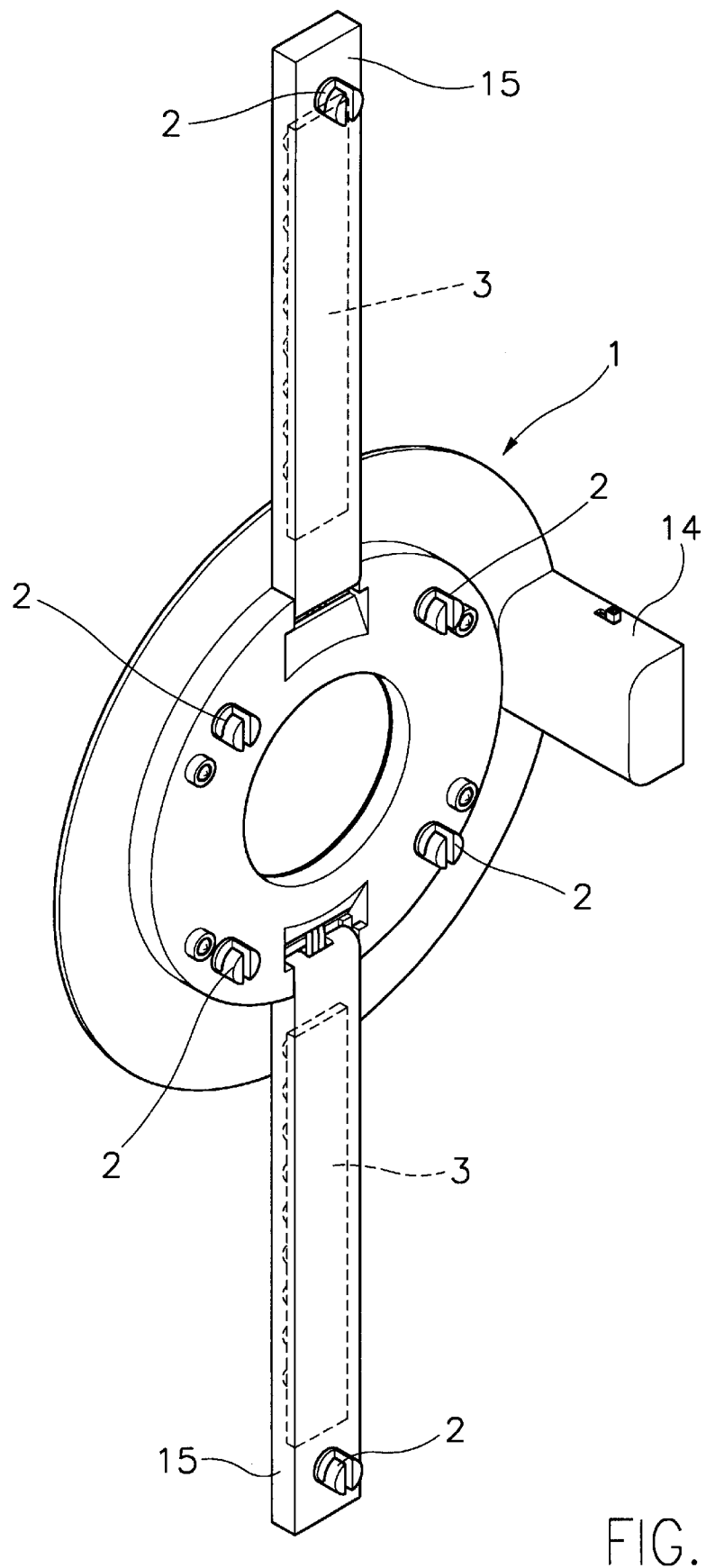
FIG. 1 is a schematic perspective view of the present invention.
Figure 2:
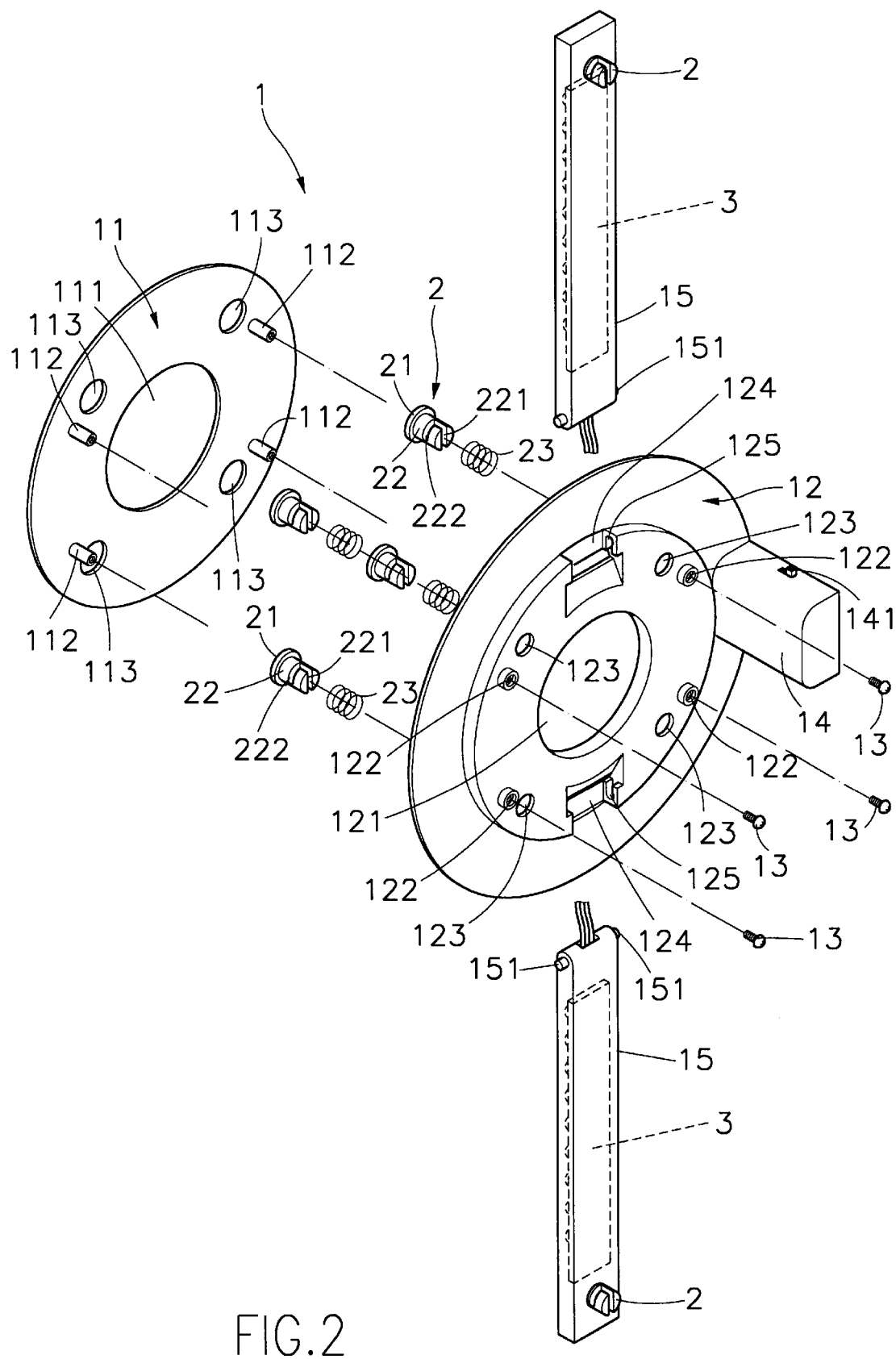
FIG. 2 is an exploded perspective view schematic showing the wheel disc device of the present invention.

With reference to FIGS. 1 and 2, the schematic perspective view and schematic exploded view of the wheel disc in accordance with the present invention are illustrated.

The wheel disc 1 includes an outer cover 11 and a seat 12. The outer cover 11 has a central hole 111 at its center 111. At proper positions of the periphery of the central hole 111 are installed with a plurality of locking studs 112. A plurality of locking holes 113 are installed on the other proper positions thereof. A central hole 121 is installed at the central position of the seat 12. A plurality of screw holes 122 are installed at the proper positions at periphery of the central hole 121, and a plurality of locking holes 123 are installed at other proper positions thereof. The locking holes 123 have a shape like a fish's eye. The central hole 121 of the seat 12, locking screw holes 122 and the locking holes 123 are at positions with respect to the central hole 111, locking studs 112 and locking holes 113. At least one pivotal portions 124 are installed at one lateral surface of the seat 12. A pivotal groove 125 is formed within the pivotal portion 124. A power source 14 is installed at the lateral surface of the seat 12. A power switch 141 is installed at the proper position of the power supply 14.

The locking device 2 includes a locking head 21, a locking body 22 and a compressible spring 23 enclosing the lock body 22. The locking head 21 and the locking body 22 are formed integrally. One end of the locking body 22 is installed with an inserting groove 221. The bottom of the inserting groove 221 is installed with a locking groove 222 in reverse direction.

After aligning the central hole 121 of the seat 12, locking screw holes 122 and the locking holes 123 to the central hole 111, locking studs 112 and locking holes 113, a plurality of studs 13 are inserted into the plurality of locking screw holes 122 of the seat 12 and the locking stud 112 of the outer cover 11 sequentially. The plurality of locking devices 2 are inserted into the locking holes 113 of the outer cover 11 and the locking holes 123 of the seat 12.

An extending arm 15 is installed at the pivotal portion 124 of the seat 12 of the wheel disc device 1. One end of the extending arm 15 is installed with pivotal pillars 151 at two sides thereof. The pivotal pillars 151 is pivotally connected to the pivotal grooves 125 of the pivotal portions 124 on the seat 12. An audio or video device 3 is installed within the extending arm 15, therefore, at least one extending arm 15 can be installed on the wheel disc device 1.

Since the extending arm 15 is pivotally connected to the wheel disc device 1. Thus, the extending arm may rotate through different angles for matching with the wheel 5 with wheel frames 51 in various orientations.

With reference to FIGS. 3, 4 and 5, the various schematic views showing the action of the locking device of the wheel disc device according to the present invention are illustrated. For a locking device 2 locking to the compressible spring 23, the inserting groove 221 thereof is inserted into a fixing strip 4. After being pressed into the lower rim of the inserting groove 221, the locking device 2 is screwed tightly to one side so that the fixing strip is locked into the locking groove 222. Then, the compressible spring 23 will be ejected so be tightly compressed with the fixing strip 4. Thus, the locking action is completely.

Figure 6:
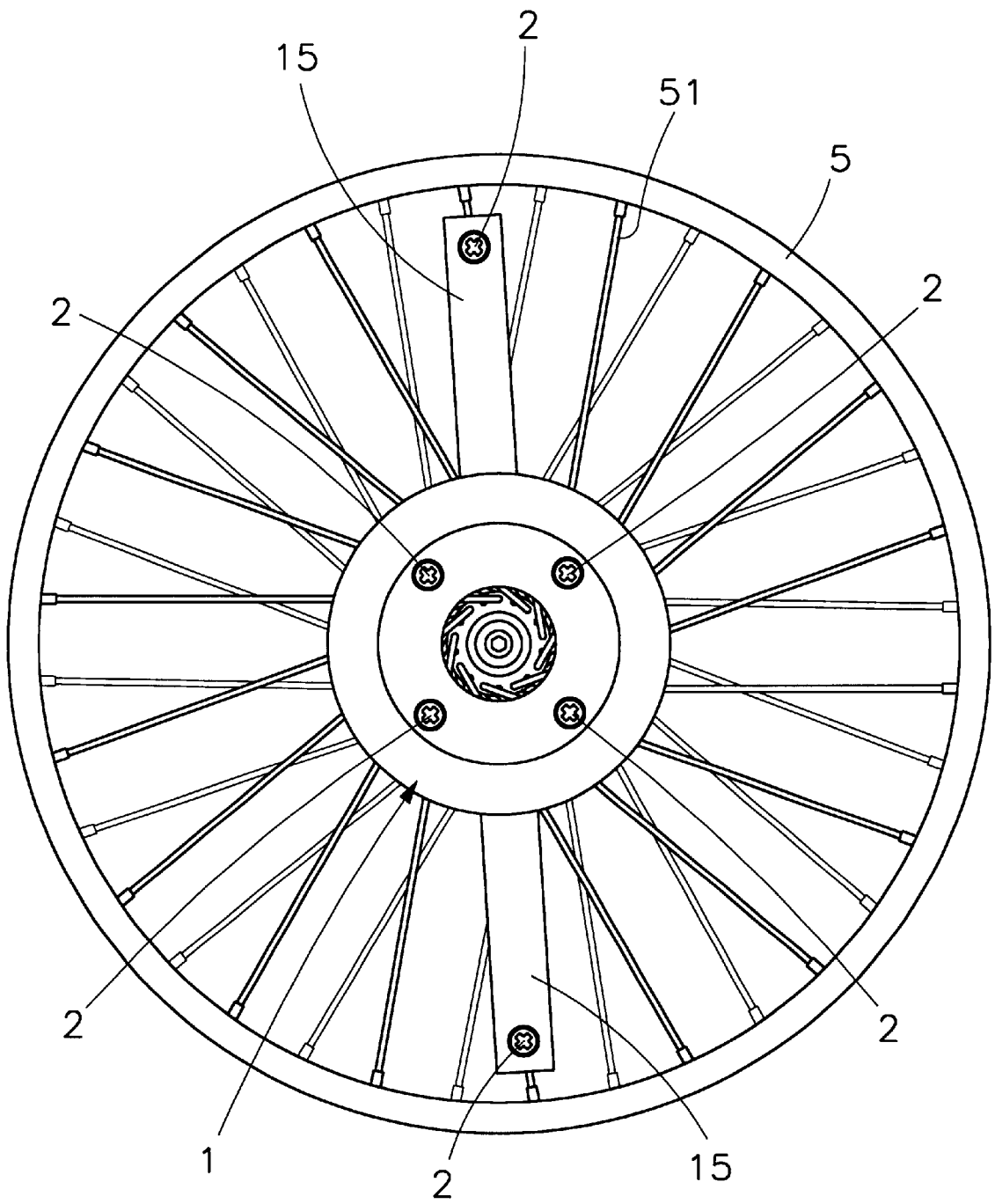
FIG. 6 is a schematic view showing the wheel disc device of the present invention being used in the wheel.
Figure 7:
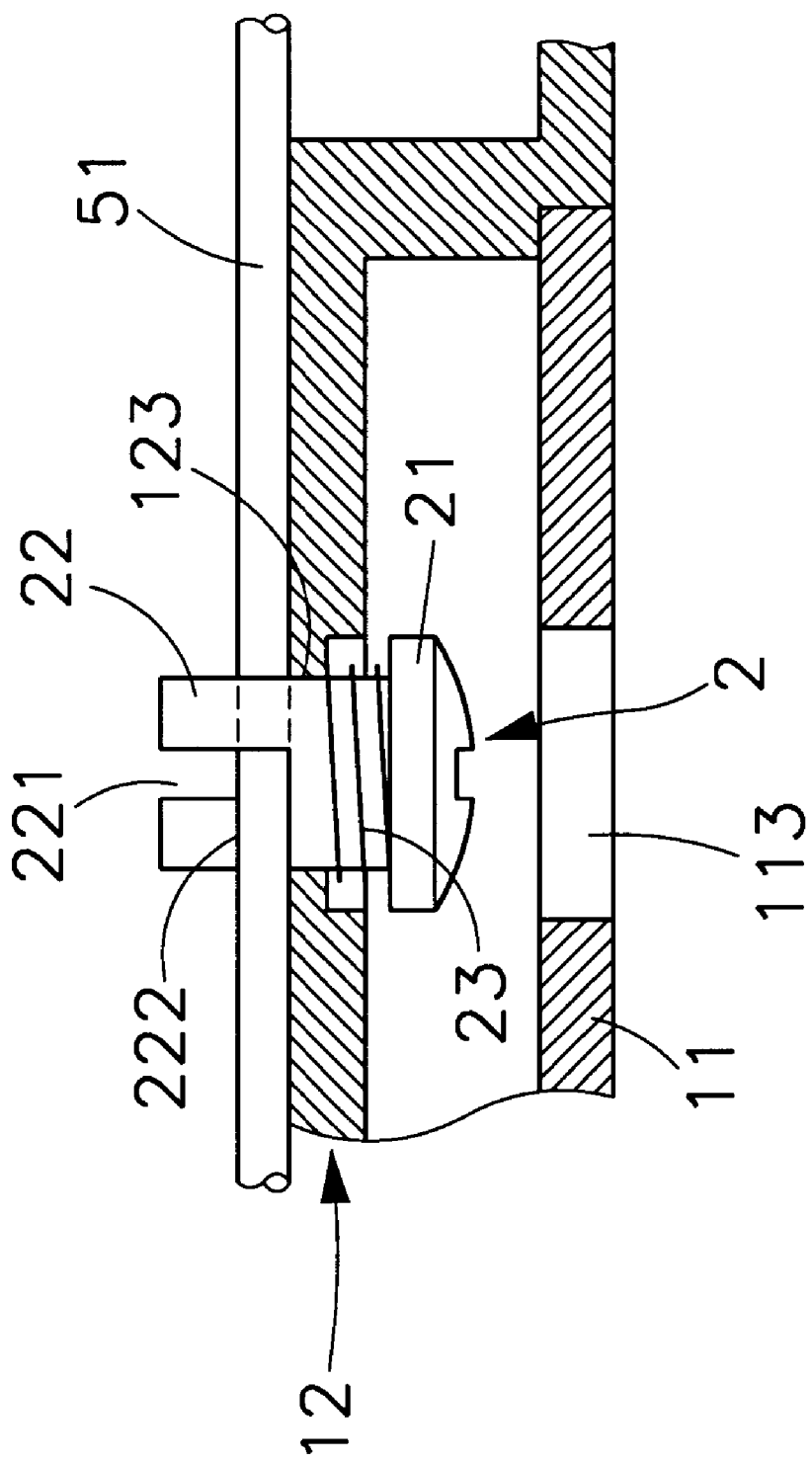
FIG. 7 is a schematic view showing the engagement of the locking device of the present invention with the wheel frame.

Referring to FIGS. 6 and 7, a schematic view showing the wheel disc device according to the present invention is matched with the locking device of the present invention, and a schematic view showing the wheel disc device is matched with the wheel frame are illustrated. It can be seen in that the present invention, the locking devices 2 of the wheel disc device 1 and the extending arm 15 and the wheel frame 51 of the wheel 5 are used as fixing means.

Therefore, the present invention is formed by a wheel disc device and a locking device. The wheel disc includes an outer cover and a seat. The wheel disc is locked to the wheel frame of a bicycle. An illuminating device is installed on the wheel disk. Moreover, an audio effect device or a video effect device, or other effect devices may be installed on the wheel disk. Therefore, as the power is actuated the bicycle is driven, a light pattern or audio effect can be generated.

In summary, the effects and functions of the present invention are illustrated in the following:

1. The present invention can be locked to the wheel within slender wheel frame. The present invention can be attached or detached without using any tool.
2. At least one extending arm can be installed. Devices, such as a video device or an audio device can be installed within the extending arm.
3. The extending arm of the present invention can be pivotally connected to the wheel disc device. The extending arm can be changed in different orientation so that the present invention is suitable for wheel with frame of various orientations.
4. The detaching and attaching of the present invention is convenient. Therefore, even the original wheel is destroyed, the present invention can be detached for being used in another wheel. Moreover, it can be detached for storage.
5. The locking device of the present invention may be employed with other slender rod as a lock.

Accordingly, the present invention can be attached to a wheel with audio devices or video devices or other devices. The defects in the prior art have been removed.

Although the present invention has been described with reference to the preferred embodiments, it will be understood that the invention is not limited to the details described thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wheel disc device comprising:
    a wheel disc including an outer cover and a seat, the outer cover having a plurality of locking holes formed therethrough, the seat having a plurality of locking holes formed therethrough in respective aligned relationship with the locking holes of the outer cover;
    a plurality of locking devices inserted into the locking holes of the outer cover and the locking holes of the seat, each of the locking devices being adapted for releasable engagement to a spoke of a wheel for securing the outer cover and the seat thereto; and,
    at least one extending arm coupled to the seat, the extending arm having a device coupled thereto selected from the group consisting of an illuminating device, an audio device or a video device.

2. The wheel disc device as claimed in claim 1, wherein the outer cover has a plurality of fixing studs coupled thereto, the seat having a plurality of fixing screw holes respectively aligned with the plurality of fixing studs.

3. The wheel disc device as claimed in claim 2, further comprising a plurality of studs for engagement with the fixing studs of the outer cover through the fixing holes in the seat for securing the outer cover to the seat.

4. A wheel disc device comprising:
    a wheel disc including an outer cover and a seat, the outer cover having a plurality of locking holes formed therethrough, the seat having a plurality of locking holes formed therethrough in respective aligned relationship with the locking holes of the outer cover, the seat having at least one pivotal portion formed therein, the pivotal portion having a pair of pivotal grooves formed in opposing sides thereof;
    a plurality of locking devices inserted into the locking holes of the outer cover and the locking holes of the seat for securing the outer cover and the seat to exterior fixing strips of a wheel; and,
    at least one extending arm installed in the pivotal portion of the seat, two lateral sides of one end of the extending arm having a pair of pivotal pillars extending therefrom, the pivotal pillars being pivotally connected to the pivotal grooves of the pivotal portion of the seat.

5. The wheel disc device as claimed in claim 4, wherein the extending arm has a device installed therein selected from the group consisting of an illuminating device, an audio device or a video device.

* * * * *